(12) United States Patent
Carpenter et al.

(10) Patent No.: US 7,543,622 B1
(45) Date of Patent: Jun. 9, 2009

(54) TIRE CHANGER HAVING OIL INJECTION SYSTEM

(75) Inventors: David M. Carpenter, Brentwood, TN (US); Charles L. Cunningham, Nashville, TN (US); Anton Varshavchik, McMinnville, TN (US)

(73) Assignee: Hennessy Industries, Inc., LaVergne, TN (US)

( * ) Notice: Subject to any disclaimer, the term of this patent is extended or adjusted under 35 U.S.C. 154(b) by 0 days.

(21) Appl. No.: 11/506,752

(22) Filed: Aug. 18, 2006

(51) Int. Cl.
*B60C 25/00* (2006.01)
*B60C 25/135* (2006.01)

(52) U.S. Cl. .................. 157/1.17; 157/1.1; 157/1.24
(58) Field of Classification Search .................. 157/1, 157/1.1, 1.24, 1.26, 1.28, 1.17
See application file for complete search history.

(56) References Cited

U.S. PATENT DOCUMENTS

| | | | | |
|---|---|---|---|---|
| 3,255,800 | A | * | 6/1966 | Strang et al. ............ 157/1.24 |
| 3,815,653 | A | * | 6/1974 | Scott et al. ............. 157/1.24 |
| 4,181,170 | A | * | 1/1980 | Price et al. ............. 157/1.1 |
| 6,182,736 | B1 | | 2/2001 | Cunningham et al. |

* cited by examiner

*Primary Examiner*—Hadi Shakeri
(74) *Attorney, Agent, or Firm*—Nelson Mullins Riley & Scarborough LLP

(57) ABSTRACT

A tire changer apparatus comprises a rotor operative to support a wheel rim. A toolhead is movable into engagement with the wheel rim during a tire changing operation. A gas distribution network is provided for routing compressed gas to pneumatic mechanisms in the tire changing apparatus. An oil injector has an outlet in fluid communication with the gas distribution network. The oil injector is operative to introduce lubricating oil into the gas distribution network. Preferably, the oil injector may include a plunger which reciprocates to inject the lubricating oil. For example, the oil injector may be operative to introduce the lubricating oil into the gas distribution network when the plunger reciprocates a selected number of times. The plunger may be moved by a foot pedal on the tire changer apparatus.

9 Claims, 3 Drawing Sheets

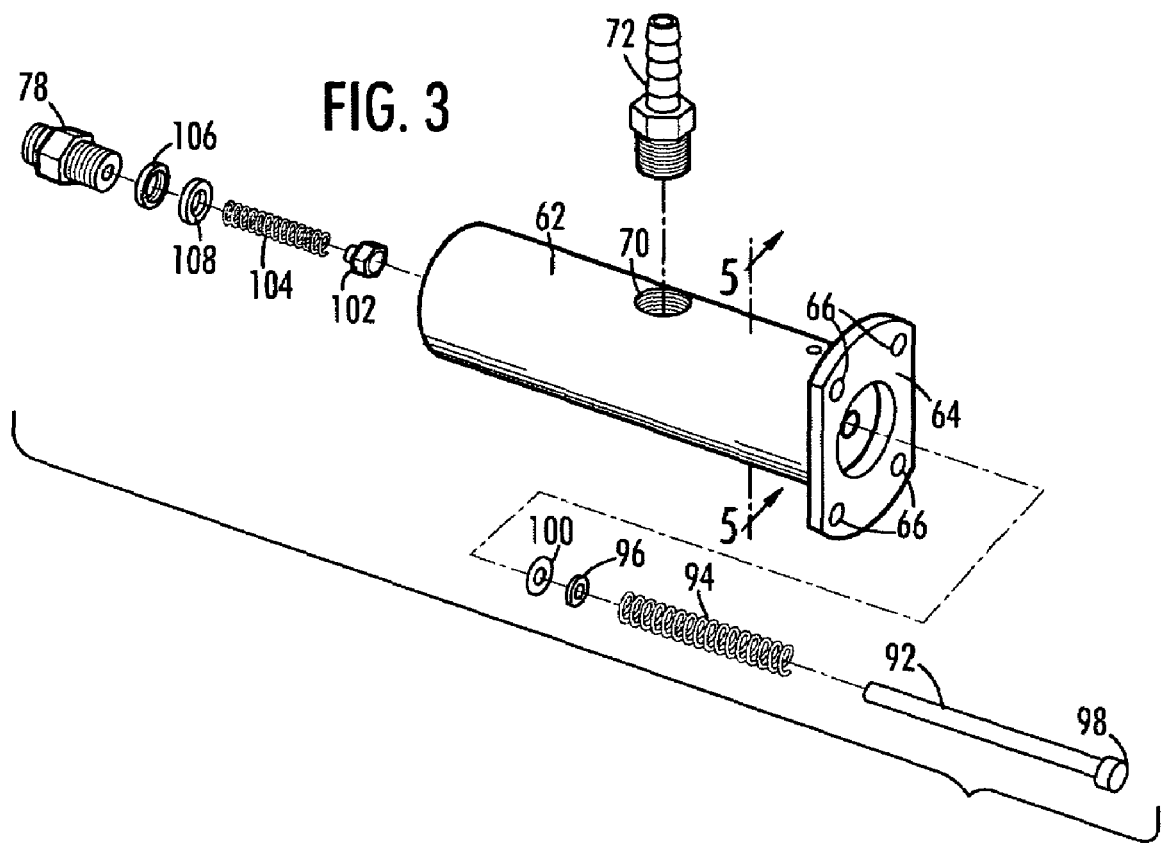
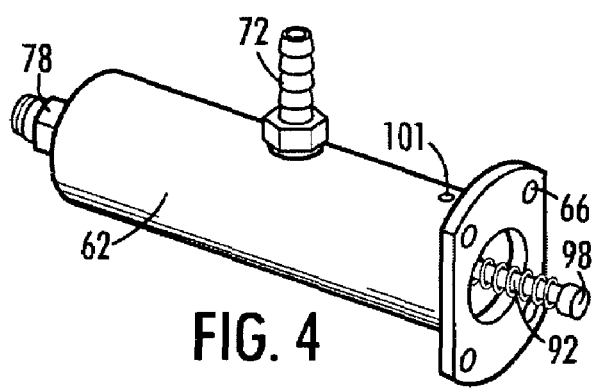
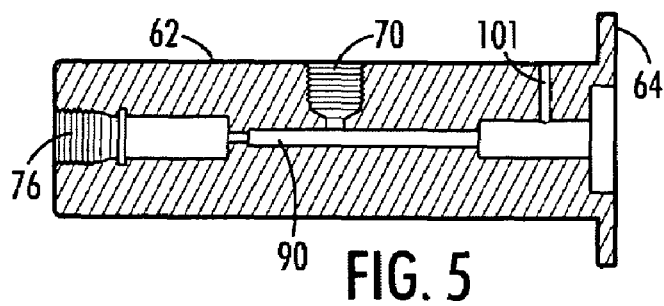

TIRE CHANGER HAVING OIL INJECTION SYSTEM

BACKGROUND OF THE INVENTION

The present invention relates generally to the art of tire changing machines. More particularly, the present invention relates to a tire changing machine incorporating an oil injection system.

Those of skill in the art of designing and manufacturing equipment used to change tires mounted on the rims of cars, light trucks, and other vehicles will appreciate that many prior art tire changing machines exist. For example, a rim holding tire changer is disclosed in U.S. Pat. No. 6,182,736 to Cunningham et al., the disclosure of which is incorporated herein by reference.

Many tire changers include pneumatic systems for the operation of various mechanisms. Among these mechanisms are bead breakers, assist arms and other features utilized in the tire changing operation. Flat turntables on which the tire is mounted for rotation are often turned by pneumatic motors located inside the base of the tire changer. In addition, radial clamps are usually provided on the turntable, which are themselves powered by pneumatics. The tire changer may also include an air hose for inflation of the tire after mounting.

As one skilled in the art will appreciate, it is necessary to lubricate the various pneumatically-powered mechanisms provided on such a tire changer. In order to achieve self lubrication, many such tire changers have been equipped with a "filter-lube." The filter-lube is a device mounted to the tire changer through which the compressed air passes before being fed to various internal components. The filter-lube includes a pair of small reservoirs, one of which contains the lubricating oil. As the air passes through the oil reservoir, some of the lubricating oil is entrained in the air. The second reservoir collects water that is removed from the air as it passes through the filter-lube.

While the filter-lube works generally well, it does have several drawbacks. In a tire changer utilizing a filter-lube, for example, all compressed air is lubricated regardless of the need. This includes compressed air utilized for tire inflation. In addition, the oil reservoir of a filter-lube is relatively small. As a result, the supply of oil in the reservoir must be replenished on a frequent basis.

SUMMARY OF THE INVENTION

The present invention recognizes and addresses the foregoing disadvantages, and others, of prior art constructions and methods.

According to one aspect, the present invention provides a tire changer apparatus comprising a rotor operative to support a wheel rim. A toolhead is movable into engagement with the wheel rim during a tire changing operation. A gas distribution network is provided for routing compressed gas to pneumatic mechanisms in the tire changing apparatus. An oil injector has an outlet in fluid communication with the gas distribution network. The oil injector is operative to introduce lubricating oil into the gas distribution network.

Preferably, the oil injector may include a plunger which reciprocates to inject the lubricating oil. For example, the oil injector may be operative to introduce the lubricating oil into the gas distribution network when the plunger reciprocates a selected number of times. The plunger may be moved by a foot pedal on the tire changer apparatus.

In some exemplary embodiments, the foot pedal may further operate an air distribution valve on the tire changer apparatus. Often, the air distribution valve may move axially by operation of the foot pedal. In such embodiments, the air distribution valve may interpose the foot pedal and the plunger.

Preferably, the tire changer apparatus may further comprise an oil reservoir in fluid communication with an inlet of the oil injector. The oil injector may operate mechanically.

According to another aspect, the present invention provides an oil injection system for a tire changer apparatus having pneumatic mechanisms powered by a source of compressed gas. The system comprises a gas distribution network for routing the compressed gas to the pneumatic mechanisms. An oil reservoir for containing a quantity of lubricating oil is also provided. The system also includes an oil injector having an inlet in fluid communication with the oil reservoir and an outlet in fluid communication with the gas distribution network. The oil injector is operative to introduce lubricating oil into the gas distribution network.

Another aspect of the present invention is achieved by an oil injector operative to introduce lubricating oil into a gas distribution network. The oil injector comprises a body defining an outlet, an inlet and a bore extending therebetween. A plunger is moveable axially in the bore. In addition, a check valve is located adjacent to the outlet. A spring operative to normally urge the plunger away from the outlet is also provided. In many preferred embodiments, the spring may be a helical spring located coaxial to a shaft of the plunger.

Other objects, features and aspects of the present invention are provided by various combinations and subcombinations of the disclosed elements, as well as methods of utilizing same, which are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 3 is an exploded view showing components of a preferred embodiment of an oil injector constructed in accordance with the present invention;

FIG. 4 is an assembled view of the oil injector of FIG. 3; and

FIG. 5 is a cross-sectional view of the oil injector body taken along line 5-5 of FIG. 3.

Figure 1:
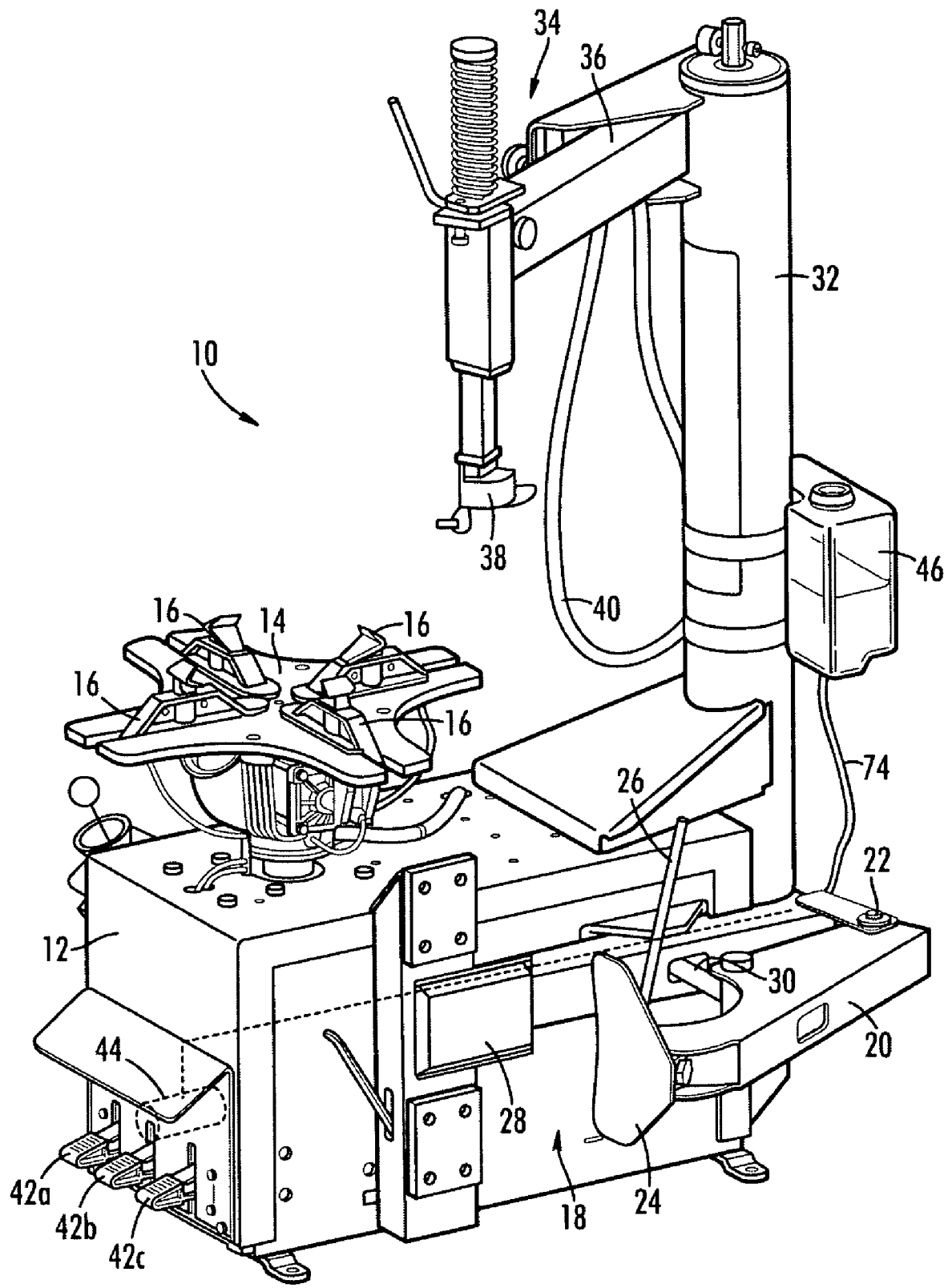
FIG. 1 is a perspective view of a tire changer apparatus constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary embodiments.

FIG. 1 illustrates a tire changer 10 constructed in accordance with the present invention. Tire changer 10 includes a base 12 in which a variety of internal mechanisms are located. A turntable 14 is located above the top of base 12 for supporting a vehicle wheel in a horizontal position for the tire changing operation. In this case, a pneumatic motor located inside of base 12 functions to rotate turntable 14. Turntable 14 includes a plurality of jaws 16 that move radially into and out of engagement with the wheel rim.

A bead loosener 18 is located on the side of base 12, as shown. Bead loosener 18 includes a hinged member 20 pivotally connected (at 22) to base 12. A loosener blade 24 is located at the distal end of hinged member 20, as shown. A control handle 26 is provided for operation of bead loosener 18. The tire's opposite sidewall (i.e., the sidewall not being engaged by loosener blade 24) will rest against pad 28 during the bead loosening procedure. Hinged member 20 is pivoted such that loosener blade 24 will move toward and away from pad 28. In this embodiment, a pneumatic cylinder, the rod of which can be seen at 30, is utilized to move hinged member 20 in this manner.

A vertical tower 32 is located at the back of base 12. As shown, a mount/demount assembly 34 is located at the upper end of tower 32. Assembly 34 includes a pivotal swing arm 36 carrying a vertically movable toolhead 38 at its distal end. An air hose 40 is provided so that the operator may inflate the new tire after it is mounted.

A series of foot pedals 42*a-c* are provided at the front of base 14 for use by the operator. Foot pedals 42*a-c* perform various functions, such as controlling rotation of turntable 14 and movement of jaws 16. In accordance with the present invention, an oil injector 44 is associated with one of the foot pedals 42*a-c*. Normal operation of the associated foot pedal will cause lubricating oil to be injected into the compressed air utilized to power various mechanisms within the tire changer.

The oil itself is supplied from a suitable oil reservoir 46. Unlike prior art systems that utilized a filter-lube, oil reservoir 46, which is in this case attached to the back of tower 32, may be relatively large. In addition, oil injector 44 allows introduction of lubricating oil at any desired location within the pneumatic plumbing of the tire changer. As a result, the oil can be added only to those pneumatic mechanisms within the tire changer requiring lubrication. Air used to inflate the tire, for example, need not be lubricated.

Referring now to FIGS. 2-5, certain additional details of oil injector 44 can be most easily described. In conventional fashion, foot pedal 42 controls operation of a pneumatic valve 50. Valve 50 includes a body 52 in which a valve spool 54 reciprocates. As a result, compressed air entering at 56 will be directed to either outlet 58 or outlet 60 (or neither).

As shown, valve 50 thus interposes foot pedal 42 and oil injector 44. Oil injector 44 includes an injector body 62 attached to the end of valve body 52. To facilitate such attachment, valve body 62 may include an end flange 64 which is juxtaposed against valve body 52. Flange 64 may define a series of holes 66 (FIG. 3) through which attachment screws 68 extend. Attachment screws 68 are received in threaded bores defined in valve body 52.

Figure 2:
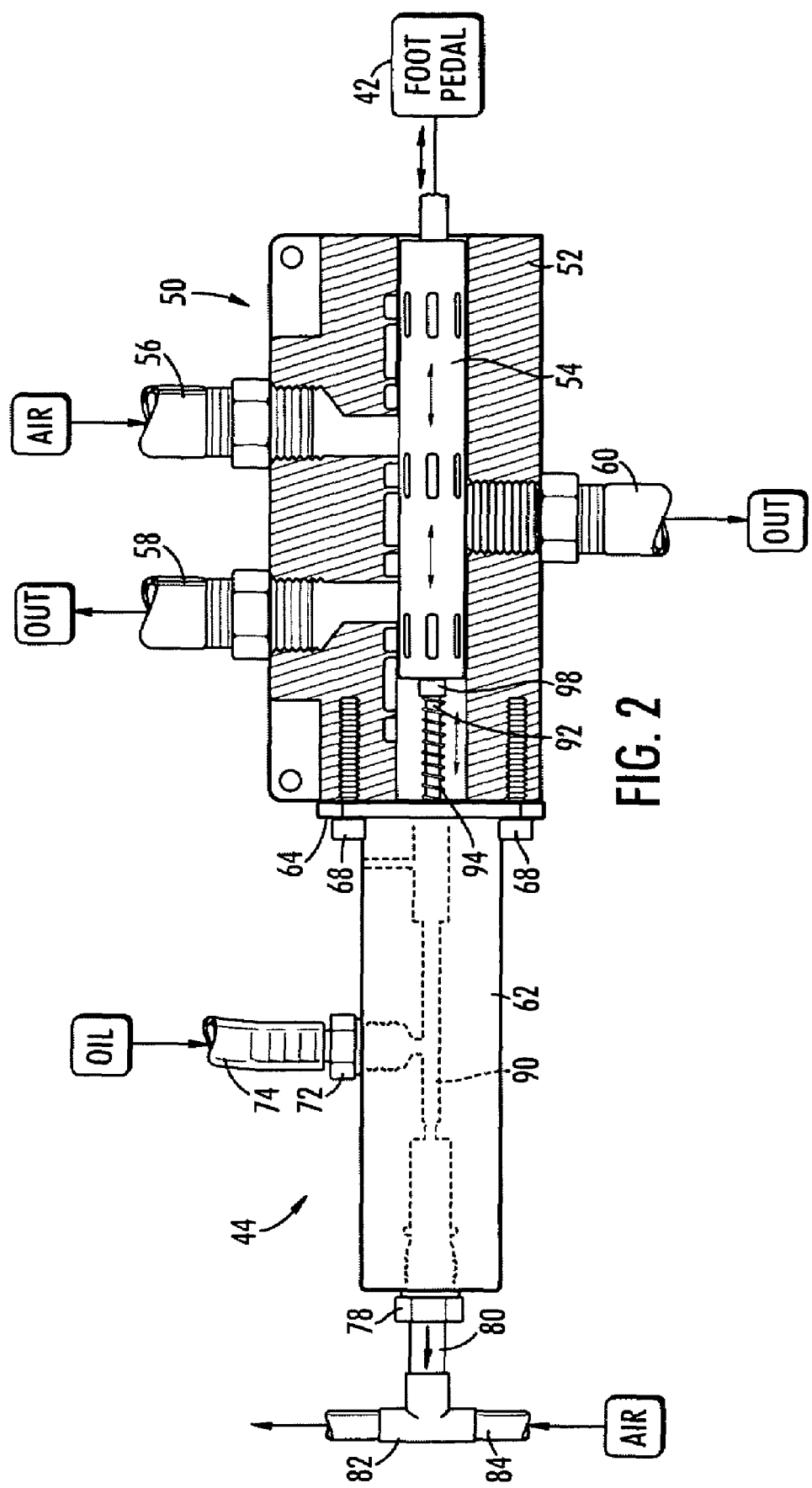
FIG. 2 is a diagrammatic representation, partially in section, of an oil injection system utilized in the tire changer apparatus of FIG. 1.

Referring now also to FIGS. 3-5, injector body 62 defines an oil inlet 70. In this case, a hose fitting 72 is located at inlet 70 for connection of oil hose 74 (FIG. 2). Hose 74 provides a supply of oil to be injected from reservoir 46.

Body 62 further defines an outlet 76 (FIG. 5) through which oil is introduced into the pneumatic network of the tire changer. In this case, a hose fitting 78 is located at outlet 76 for connection of an outlet hose 80. Hose 80 extends to a T-connector 82 by which it is joined to the main air supply hose 84. It will be appreciated, however, that T-connector 82 may be positioned along hose 84 downstream of the location at which other systems not requiring lubrication are diverted. For example, connector 82 may be located downstream of the point at which inflation hose 40 is connected to main air hose 84.

A central bore 90 is defined in injector body 62, and extends between oil inlet 70 and oil outlet 76. A plunger 92 extends from bore 90 into engagement with the end of spool 54. In this regard, a spring 94 is provided to urge plunger 92 into positive engagement with spool 54. In this case, spring 94 is a helical spring located about and coaxial with plunger 92. Spring 94 is retained between a washer 96 and the enlarged end portion 98 of plunger 92. An O-ring 100 is located behind washer 96 to inhibit leakage of oil on the "plunger side" of injector body 62.

Preferably, oil injector 44 is configured so that one drop of oil is introduced into the air supply when plunger 92 reciprocates a predetermined number of times. For example, a drop of oil may be injected on every fourth cycle of plunger 92.

In order to control release of oil, and to prevent flow of compressed air into injector body 62, a suitable check valve assembly is preferably provided. In this case, the check valve assembly includes a check valve element 102 urged against the end of bore 90 by a spring 104. Spring 104 is retained at its opposite end by a retainer 106 and spring seat 108. Preferably, a small air hole 101 is defined in injector body 62 for the purpose of relieving any pressure build up when spool 54 is actuated.

It can be seen that the present invention provides a tire changer having a novel oil injector system. The system allows the use of a relatively large oil reservoir, while eliminating the need for a filter-lube device as has been used in the past. Lubricating oil can be selectively introduced at the necessary locations, while avoiding unnecessary lubrication of systems where it is not required.

While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the present invention. Therefore, it is contemplated that any and all such modifications are included in the present invention as may fall within the literal and equivalent scope of the appended claims.

What is claimed is:

1. A tire changer apparatus comprising:
   a rotor operative to support a wheel rim;
   a toolhead movable into engagement with said wheel rim during a tire changing operation;
   a gas distribution network for routing compressed gas to pneumatic mechanisms in said tire changer apparatus;
   a pneumatic valve in fluid communication with said gas distribution network, said pneumatic valve being operated by a user actuator, said pneumatic valve including a spool;
   an oil injector having an outlet in fluid communication with said gas distribution network, said oil injector being operative to introduce lubricating oil into said gas distribution network to lubricate said pneumatic mechanisms; and said oil injector having:
- a body defining said outlet, an inlet and a bore extending therebetween;
- a plunger movable axially in said bore; and
- said plunger being operatively connected to said actuator via said spool of said pneumatic valve such that movement of said actuator by a user causes reciprocation of said plunger to inject said lubricating oil.

2. A tire changer apparatus as set forth in claim 1, wherein said oil injector is operative to introduce said lubricating oil into said gas distribution network when said plunger reciprocates a selected number of times.

3. A tire changer apparatus as set forth in claim 1, wherein said actuator is a foot pedal on said tire changer apparatus.

4. A tire changer apparatus as set forth in claim 3, wherein said spool moves axially by operation of said foot pedal.

5. A tire changer apparatus as set forth in claim 4, wherein said pneumatic valve interposes said foot pedal and said plunger.

6. A tire changer apparatus as set forth in claim 1, further comprising an oil reservoir in fluid communication with said inlet of said oil injector.

7. A tire changer apparatus as set forth in claim 1, wherein said oil injector operates mechanically.

8. A tire changer apparatus as set forth in claim 7, wherein said oil injector comprises:
- a check valve located adjacent to said outlet.

9. A tire changer apparatus as set forth in claim 1, wherein said plunger is urged away from said outlet by a spring.

* * * * *